United States Patent [19]

Dimmick

[11] Patent Number: 4,470,112
[45] Date of Patent: Sep. 4, 1984

[54] CIRCUITRY FOR ALLOCATING ACCESS TO A DEMAND-SHARED BUS

[75] Inventor: James O. Dimmick, Boulder, Colo.

[73] Assignee: Bell Telephone Laboratories, Incorporated, Murray Hill, N.J.

[21] Appl. No.: 337,673

[22] Filed: Jan. 7, 1982

[51] Int. Cl.³ .............................................. G06F 7/02
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,796,992 | 3/1974 | Nakumura et al. | |
| 3,818,447 | 6/1974 | Craft. | |
| 3,983,540 | 9/1976 | Keller et al. | 364/200 |
| 4,385,350 | 5/1983 | Hansen et al. | 364/200 |

*Primary Examiner*—Thomas M. Heckler
*Attorney, Agent, or Firm*—Donald M. Duft

[57] ABSTRACT

Circuitry is disclosed for allocating requests for demand-shared bus access among a plurality of requesting ports. During bus contention time, each requesting unit synchronously and sequentially applies the digits of its unique priority code to the bus beginning with the most significant digit. Each requesting unit remains in contention only so long as each digit it applies is greater than or equal to the digit applied by any other unit. After the application of all digits, only the requesting unit having the highest code remains in contention and it seizes the bus. A polarity control conductor is provided, selectively altering the preference that is normally specified by the assigned priority codes. The application of a reversal signal to this conductor for a given interval of time causes each requesting unit to invert each bit of its priority code it applies to the bus during this time interval. The polarity conductor thus permits the normal preference between units to be altered selectively in any pattern that may be desired.

14 Claims, 7 Drawing Figures

CIRCUITRY FOR ALLOCATING ACCESS TO A DEMAND-SHARED BUS

CROSS-REFERENCE TO RELATED APPLICATIONS

This application is related to the following concurrently filed applications:

G. J. Grimes 2, Ser. No. 337,672, entitled "Circuitry for Allocating Access to a Demand-Shared Bus";

G. J. Grimes 3, Ser. No. 337,674, entitled "Circuitry for Allocating Access to a Demand-Shared Bus";

and G. J. Grimes 4, Ser. No. 337,868, entitled "Circuitry for Allocating Access to a Demand-Shared Bus."

TECHNICAL FIELD

This invention relates to a shared resource system and, more particularly, to apparatus for assigning access to the resource equitably among a plurality of requesting devices. More particularly, the invention relates to a packet switching system having an allocation facility for equitably controlling access to a common bus by a plurality of requesting devices such as ports.

BACKGROUND OF THE INVENTION

Systems in which many devices share a common resource typically utilize arrangements for allocating access to the resource under conditions during which a plurality of associated devices may concurrently request access to the resource. Many different allocation arrangements are known in the art. In data processing and packet switching systems, it is known to use a centralized allocator or controller for allocating access to a common data bus interconnecting a plurality of units, such as ports, that may concurrently request access to the bus. The controller may be programmed with an appropriate algorithm to allocate bus access and use in accordance with any priorly determined criterion that may be desired. Although centralized controller allocation arrangements operate suitably to perform their intended function, they are not always desirable because of the inherent system complexity resulting from the many interconnections required between the controller, the bus, and the ports. Also, a reliability problem exists since a malfunction of the controller may remove the whole system from operation. A system having a centralized controller is shown by U.S. Pat. No. 3,983,540 issued Sept. 28, 1976 to Keller et al.

It is known to use distributed bus allocation arrangements in which a controller is not used to determine access and instead, the interaction of the requesting ports determines the bus allocation in the event of simultaneous requests. Such distributed arrangements are often preferable since the expense of and the reliability problems associated with the centralized controller arrangement are avoided.

In accordance with one such distributed allocation arrangement, each port or unit that may request access to a common bus or resource is assigned a fixed priority number comprising a plurality of binary digits. Access is granted by priority number in case of concurrent requests. During bus contention time, when two or more units or ports concurrently request access, each requesting unit applies the corresponding bits of its priority number to an arbitration bus sequentially, bit by bit, in synchronism with the application of corresponding bits by all other concurrently requesting ports. As each bit is applied, each bidding port compares the magnitude of the bit it is currently applying to the arbitration bus with the logical union of the corresponding bits applied simultaneously by all concurrently requesting ports. If the bit a requesting port currently applies has a prescribed relationship (such as equal to or higher) to the bits applied to the bus by the other requesting ports, this operation proceeds and the port applies the next bit of its priority number to the arbitration bus.

Each port stays in contention as long as each bit it applies has the prescribed relationship to the logical union of the corresponding bits currently applied by other ports. A port removes itself from contention when it determines that a bit it applies has a relationship (such as is lower than) to the bits applied by the other ports indicating that one or more of the other ports has a higher priority number. At that time, each port having a lower priority number removes itself from contention and applies no further bits to the bus.

This contention operation continues; the remaining bits of the port priority numbers are applied to the bus by all remaining ports; ports of a lower priority remove themselves from contention; and at the end of the contention interval when the last bit is applied to the bus, only the port having the highest priority remains in contention and it is granted access to the bus.

An arrangement of the above described type is shown in U.S. Pat. No. 3,796,992 issued Mar. 12, 1974 to Nakamura et al and in U.S. Pat. No. 3,818,447 issued June 18, 1974 to Craft.

The above described distributed contention arrangement operates satisfactory. However, it suffers from the disadvantage that the port priority numbers are fixed and, since port access is determined by these numbers, the ports may be considered to be functionally arranged in a fixed preference chain with the most preferred port having the highest priority number and the least preferred port having the lowest priority number. This being the case, access to the bus is not equitable since the ports having the higher priority numbers are always favored in the event of simultaneous requests. While this unequitable allocation of ports may be tolerable in certain systems, it is a disadvantage in those systems in which equitable access by all ports is required.

SUMMARY OF THE INVENTION

My invention is directed to a solution of the foregoing problems and limitations of the prior art. I provide an improved method and structure for allocating a demand-shared bus among one or more requesting units or ports each of which has its own unique priority number comprising a plurality of binary coded digits.

As before, the corresponding digits of each requesting port are applied concurrently to a bus during contention time sequentially, bit by bit. The bit values of each contending port are compared in a prescribed order to the corresponding bus digit value. A unit is removed from bus contention if, on any digit comparison, a prescribed result is obtained indicating that another port of higher priority is requesting access. Specifically, in the disclosed embodiment of the invention, the priority numbers are binary coded bits and the priority is based on the magnitude of the applied priority number. Thus, in a system having a plurality of ports in which a first port has a binary priority number of 111 and in which the last port has in the sequence a priority number of 000, the first port is normally the most preferred when requesting access; the port having the priority number of 000 is normally the least preferred.

Further, in accordance with my invention, I provide flexibility in the port preference by providing a conductor, termed a polarity conductor, that extends from a system controller to each port. The controller can apply a signal to the polarity conductor at any time during a bus contention interval to cause each currently requesting port to apply the inverse of its assigned priority digit to the arbitration bus.

Assume ports having the priority numbers of 111 and 000 are concurrently contending. It may be appreciated that port 111 will normally obtain access to the bus since its priority number is of greater magnitude than that of port 000. However, in accordance with my invention, the preference may be altered by the controller, which may apply a potential to the polarity conductor so that, during a given contention interval, each port inverts the bits that it would otherwise apply to the bus. Thus, port 111 then applies the bits 000 to the bus while port 000 applies the bits 111. This causes port 000 to be the most preferred and to obtain access to the bus. Also, the controller may operate in a mode so that the polarity bus is activated only during a portion of the contention interval, say for the first applied digit. This being the case, the port having the assigned priority number of 111 will apply the bit pattern 011 to the bus; the port having the number 000 will apply the bit pattern 100 to the bus. This causes port 000 to obtain preference in a system where the first applied bit is the most significant bit of the port number.

The above described arrangement overcomes the disadvantage of the prior art in that it provides increased flexibility and a more equitable allocation of ports for access to a facility or bus in systems in which each port is assigned a fixed priority number whose magnitude determines the bus access priority.

BRIEF DESCRIPTION OF THE DRAWINGS

The foregoing and other advantages of my invention will be apparent from the following detailed description of an exemplary embodiment thereof, when read in conjunction with the accompanying drawing, in which.

DETAILED DESCRIPTION

Figure 1:
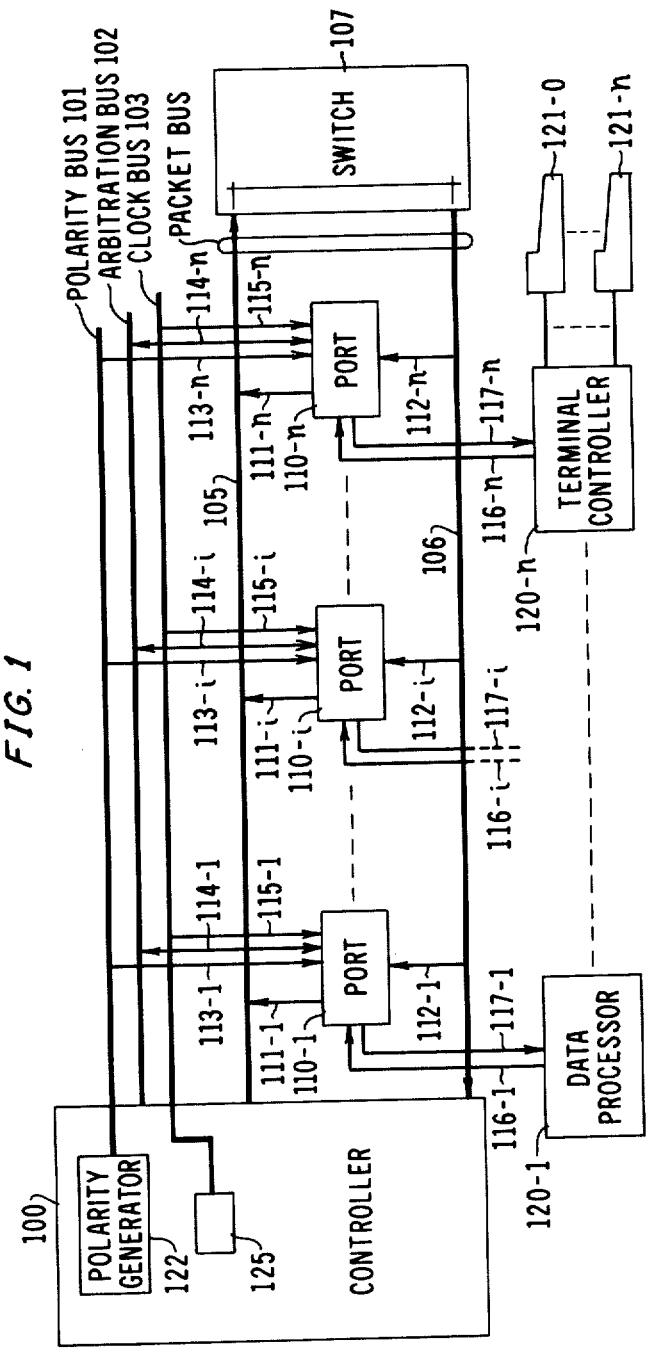
FIG. 1 is a simplified block diagram illustrating the components of a typical system in which my invention may be utilized.

FIG. 1 discloses a packet switching system embodying the present invention. On FIG. 1 is disclosed a controller 100, having a polarity generator 122, ports 110-1 through 110-n, switch 107, and a plurality of busses interconnecting the controller 100 with the ports 110. These busses include packet busses 105 and 106 which receive the data applied from the output 111 of each port and directed to another port. Packet bus 106 receives this data after it has been extended through switch 107 and applies it to the input 112 of each port. Clock bus 103 extends the signals shown in FIG. 3 from the controller to the ports. Arbitration bus 102 concurrently receives the corresponding priority bits applied sequentially by each requesting port during bus contention time. Polarity conductor 101 applies a potential from controller 100 to the ports 110 at selected times to cause them to apply to bus 102 the inverse of each digit of their priority number.

Data processor 120-1 and terminal controller 120-n, together with terminals 121, are illustrative of the type of facilities that may be served by the ports. As is typical in packet switching, a transmitting port that obtains access to the packet bus 105 transmits whatever data may be desired over the packet bus 105, through switch 107, and over packet bus 106 to the input 112 of the port to which the information is directed.

Figure 2:
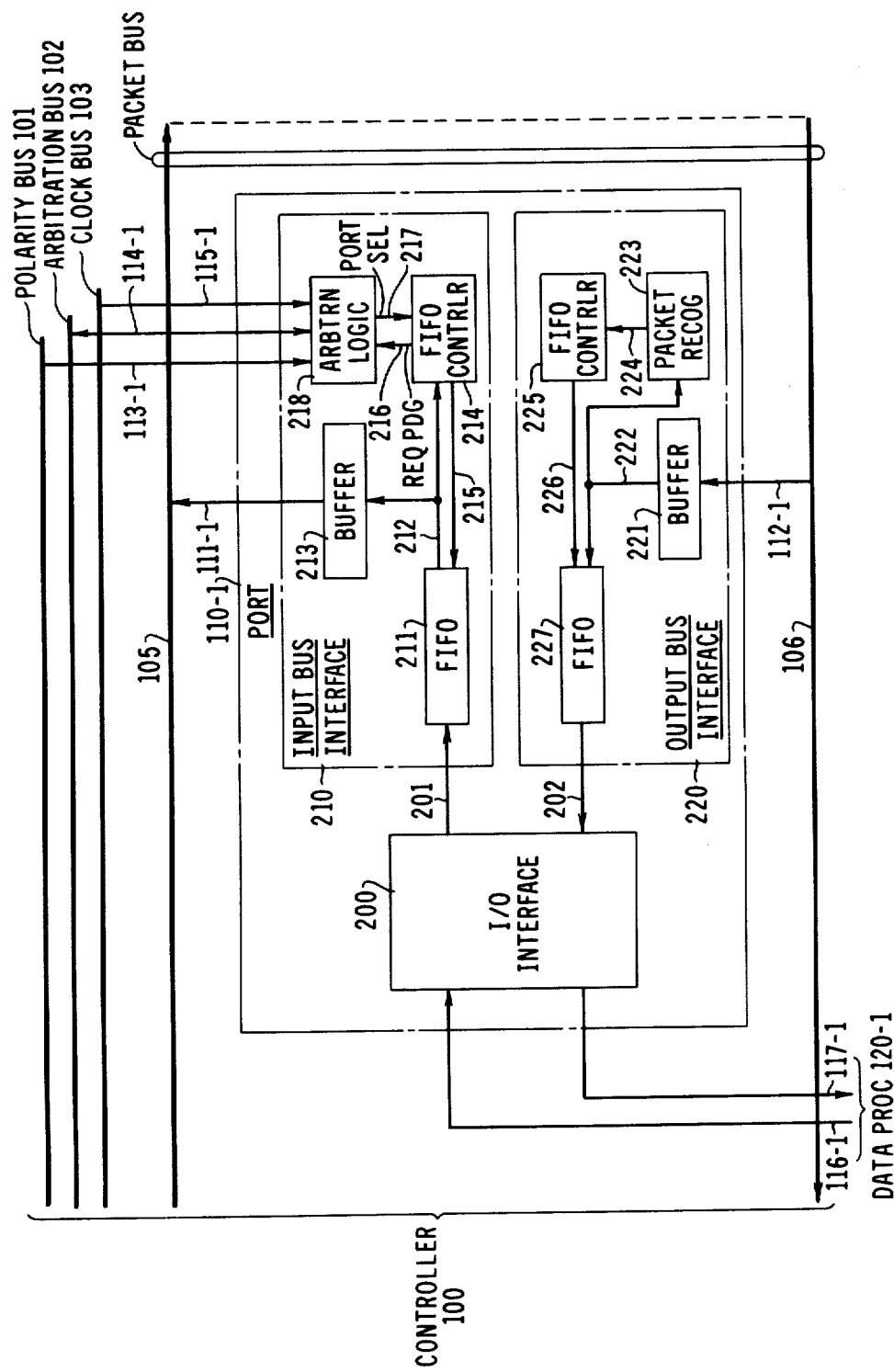
FIG. 2 discloses further details of the port circuit of FIG. 1.

FIG. 2 discloses further details of the ports 110 of FIG. 1. Each port includes an I/O interface 200, an input bus interface 210 and an output bus interface 220. The input bus interface 210 includes arbitration logic 218 and buffer 213 which applies data to the packet bus 105. Output bus interface 220 contains the circuitry by which the port receives information from packet bus 106.

Typically, the data processor 120 served by the port of FIG. 2 applies a packet of information to be sent to another port over path 116-1, through I/O interface 200 and over path 201 to FIFO 211. The FIFO controller 214 detects the receipt of a complete packet by FIFO 221, transmits a request for bus access to arbitration logic 218 which then functions during the next contention or arbitration interval to obtain access for the port to bus 105. Upon obtaining such access, FIFO controller 214 causes FIFO 211 to apply the packet information it contains via buffer 213 to packet bus 105. This information includes header information identifying the port to which the packet is being sent. After passing through the switch 107 on FIG. 1, the information is applied to packet bus 106, over path 112 of the receiving port, and via its buffer 221 to its FIFO 227 and its packet detector 223. Element 223 detects that the information now in FIFO 227 is indeed directed to this port and then, by means of FIFO controller 225, causes FIFO 227 to output the information via path 202, I/O interface 200, and over path 117 to the device served by the receiving port.

Figure 3:
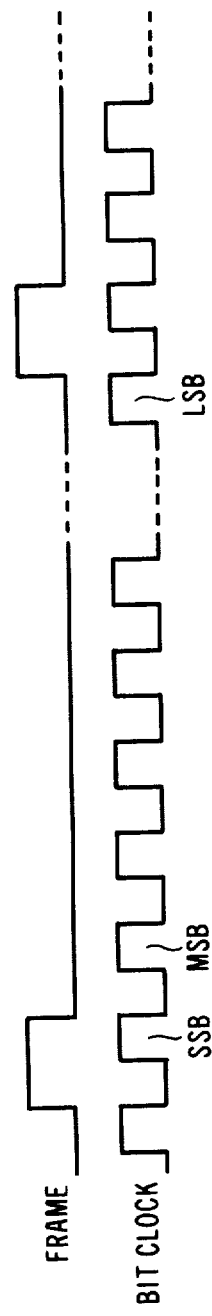
FIG. 3 is a timing diagram.

FIG. 3 discloses the waveforms of the timing and control signals applied over clock bus 103 to the ports. The top signal is a positive frame pulse and identifies the beginning of each frame. A bus contention interval begins with the frame pulse. The lower signal is the bit clock signal and it is used for a number of control purposes during the contention or arbitration interval as well as for controlling the input and output of data from the port circuit to packet bus 105.

Figure 4:
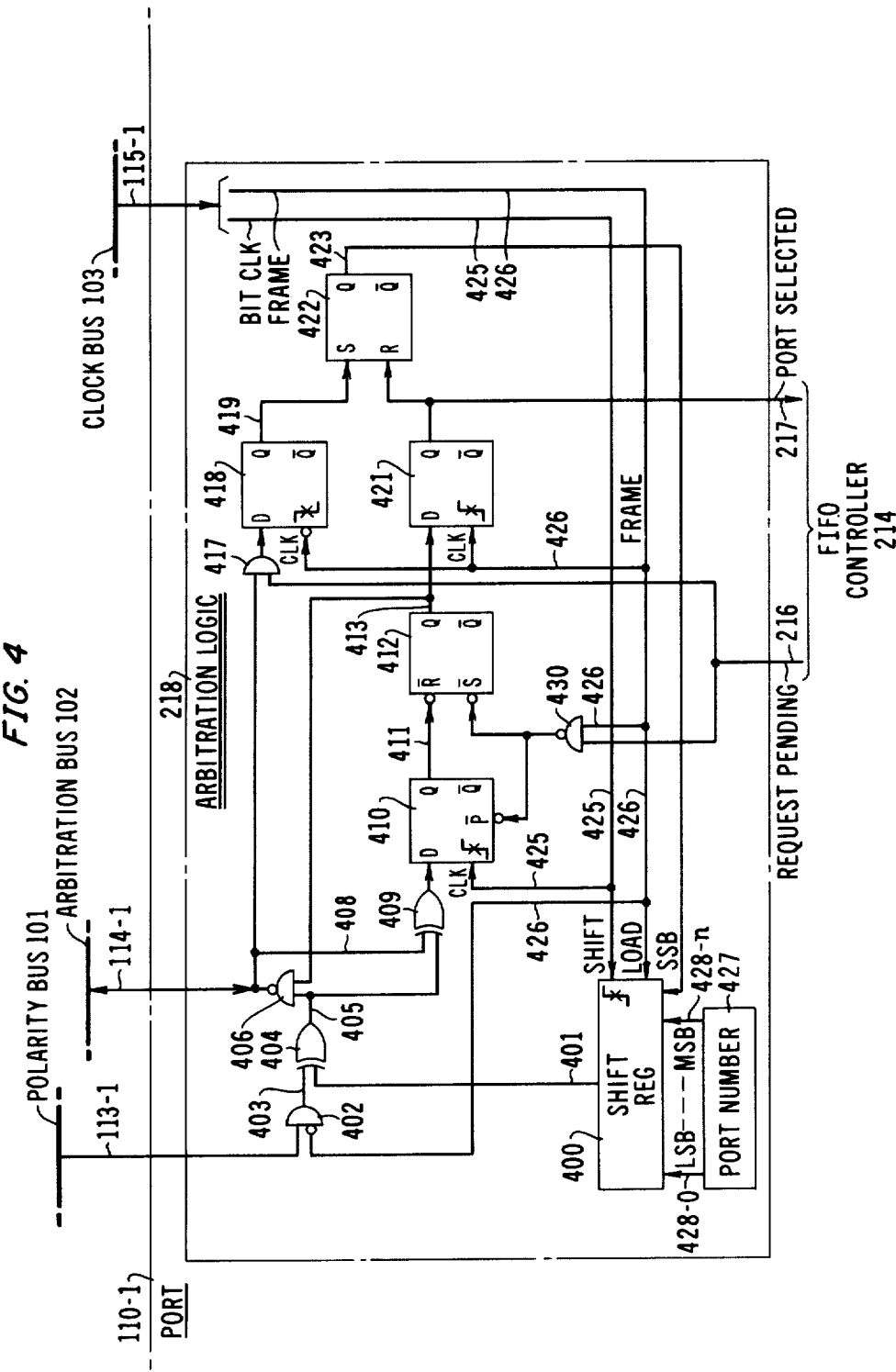
FIG. 4 discloses the circuit details of the arbitration logic of the port of FIG. 2.

The details of the arbitration logic 218 of FIG. 2 are illustrated in FIG. 4. At the start of a frame as shown on FIG. 3, a START OF FRAME pulse on path 426 causes the assigned port number to be parallel loaded from element 427 into Shift Register 400 over paths 428. If a port REQUEST PENDING signal, a HI, is present on path 216, this signal and the START OF FRAME signal 426 are inverted to a LO by NAND gate 430. This LO is inverted HI on the P (not P) pre-set input to flip-flop 410 and on the S (not S) input to flip-flop 412. The P signal on flip-flop 410 causes the flip-flop to assume the set condition (Q=HI). The low on the S input sets flip-flop 412. The setting of flip-flop 412 and the HI on its Q output enables the right input of open collector NAND gate 406 over path 413. This partially enables the gate so that it can apply the port number bits read out of shift register 400 to the arbitration bus 102 via gates 404 and 406.

The contents of the shift register are now sequentially read out under control of the clock pulses on path 425. The upper input of gate 404 is low because of a low on bus 101 and thus the bits read out of shift register 400 pass through gate 404 unchanged and are applied to the left input of gate 406. The right-hand input of gate 406 is enabled by the high from the Q output of flip-flop 412. Thus, the bits received by the left input of gate 406 are inverted and applied to bus 102.

The noninverted port number bits are also applied by gate 404 to the lower input of exclusive-OR gate 409. The upper input of gate 409 is connected to bus 102. As each bit is read out of the shift register and applied to bus 102 after being inverted by gate 406, exclusive-OR gate 409 compares the digit value now on arbitration bus 102 with what this port puts on the bus after being inverted by gate 406. If there is no mismatch, the next digit is read out of the shift register and applied to bus 102 in inverted form by gate 406. A mismatch does not exist when the digit that the port of FIG. 4 puts on the bus is equal to or higher than that put on the bus by other contending ports.

If there is a mismatch, the inputs of gate 409 are equal and the output of gate 409 goes LO. A mismatch exists when bus 102 is LO and the port signal from gate 404 is LO. This condition exists when the port of FIG. 4 applies an 0 as a HI to bus 102 from gate 406 while another port applies a 1 as a LO to the bus. Since the bus is a hard wired gate, the applied LO (the 1) from another port overcomes the HI (the 0) by the port of FIG. 4 and pulls the bus LO. The other port that applies the 1 as a LO to the bus wins the contention and is granted bus access since its applied priority number bit is higher than that of the presently described port. At the rising edge of the next bit clock pulse, the LO from gate 409 on the D input of flip-flop 410 is transferred to its Q output. The resulting LO output at Q of flip-flop 410 is applied over path 411 and is inverted LO at R of flip-flop 412 to reset it. The LO output at Q of reset flip-flop 412 is extended over path 413 and effectively removes gate 406 from the bus by disabling its right-hand input. Thus, the port of FIG. 4 fails to win the bus arbitration under the above described mismatch condition.

The port with the highest port number that also has a REQUEST PENDING is the one and only port that still has its flip-flop 412 set after all the bits have been read out of the shift register 400 over path 401, extended through gate 404, inverted by gate 406, and applied to bus 102. This port wins the bus arbitration. Its flip-flop 412 is still in a set state at the time of the next frame pulse and flip-flop 412 then sets flip-flop 421 which drives its Q output high as a port select signal on path 217.

The above discussed arbitration scheme results in a fixed priority of ports for bus access with the highest priority going to the port with the largest port number. It can be argued that if the bus 105 occupancy is low enough, this fixed priority of the ports is acceptable since very few ports are waiting for bus access at any instant. The counter argument is that as the occupancy increases, performance should not be degraded, because performance is most critical during high occupancy conditions.

Flexibility of port priority may be achieved in accordance with my invention by the selective use of polarity conductor 101 to invert one or more bits of the port priority number read out of the shift register during bus contention time. Assume each port number is represented symbolically as $P_0, P_1, --- P_N$, where P, represents one bit. Because the port numbers are hardwired in element 427, each set $P_0 P_1 --- P_N$ is unique for each port. If the same bit inversion operation is performed on one or more bits of all ports, then there is no effect on this uniqueness. Thus, the form $P_0 P_1 --- P_N$ is still unique for all ports.

If there are N bits in the port number, then there are $2^N$ ways of inverting a subset of the bits on all ports and not inverting the rest of the bits. By using all $2^N$ different port priority arrangements, each port will have highest priority in one arrangement, second highest in one arrangement, - - -, and lowest priority in another arrangement.

This can be illustrated for N=3 as follows:

| Port # | $P_2P_1P_0$ | $P_2P_1\overline{P_0}$ | $P_2\overline{P_1}P_0$ | $P_2\overline{P_1P_0}$ | $\overline{P_2}P_1P_0$ | $\overline{P_2}P_1\overline{P_0}$ | $\overline{P_2P_1}P_0$ | $\overline{P_2P_1P_0}$ |
|---|---|---|---|---|---|---|---|---|
| 0 | 1st | 2nd | 3rd | 4th | 5th | 6th | 7th | 8th |
| 1 | 2nd | 1st | 4th | 3rd | 6th | 5th | 8th | 7th |
| 2 | 3rd | 4th | 1st | 2nd | 7th | 8th | 5th | 6th |
| 3 | 4th | 3rd | 2nd | 1st | 8th | 7th | 6th | 5th |
| 4 | 5th | 6th | 7th | 8th | 1st | 2nd | 3rd | 4th |
| 5 | 6th | 5th | 8th | 7th | 2nd | 1st | 4th | 3rd |
| 6 | 7th | 8th | 5th | 6th | 3rd | 4th | 1st | 2nd |
| 7 | 8th | 7th | 6th | 5th | 4th | 3rd | 2nd | 1st |

The polarity bus 101 allows the port priorities to be flexibly changed from the polarity generator 122 in bus 101. The simplest arrangement is to alternate the polarity bus for the entirety of alternate frames. If the port numbers are assigned sequentially, this would result in two priority arrangements (1) by the magnitude of the priority number, and (2) by the inverse of the priority number. This arrangement alone may provide a sufficient variation of priorities.

Polarity bus 101 is LO for a noninversion operation and HI for an inversion operation. The polarity bus 101 signal from bus 101 is applied over path 113 and through gate 402 to the upper input of exclusive-OR gate 404. The low that is normally on path 426 partially enables gate 402 on its lower input so that it passes the signal on bus 101. The lower input of exclusive OR gate 404 receives the port priority bits from shift register 400. With the upper input of gate 404 LO, for a noninversion condition of bus 101, and the port priority bit LO from the shift register, the output of gate 404 is LO. If the polarity bus signal is HI for an inversion condition, and the port priority bit LO, the output of gate 404 will be HI. Thus a LO signal on the polarity bus 101 applies a LO to the upper input of gate 404 and allows the port priority bits from shift register 400 to pass through the gate 404 unchanged. A HI signal on the polarity bus to the upper input of gate 404 causes gate 404 to invert the shift register bits applied to its lower input. These inverted bits are applied to the left input of gate 406, inverted by gate 406 and applied to bus 102. The output signals from exclusive-OR gate 404 also extend to the lower input of exclusive-OR gate 409. The port priority signals are thus sequentially applied to both gates 406 and 409 during the arbitration sequence so that gate 409 can detect a match or mismatch condition for each digit applied by the port to bus 102.

As discussed previously, the port with the highest port number that also has a REQUEST PENDING is the only one whose flip-flop 412 remains in a set state after all the bits have been read out of the shift register over path 401 and applied to bus 102. This port wins the bus arbitration. The set state of flip-flop 412 and the HI on its Q output sets flip-flop 421 on the leading edge of the next frame pulse. The setting of flip-flop 421 applies a signal from its Q output to path 217 to advise the port that it has been granted access to data bus 105. Flip-flop 421 allows the serial arbitration to be overlapped in time with the data transfer associated with the previous arbitration cycle.

Total flexibility of port preference can be achieved by running the polarity bus 101 through all $2^N$ sequences possible while keeping polarity bus transitions synchronized with the bit clock. There are two ways to get the $2^N$ sequences. The first method is sequential by frame. This method in $2^N$ frames permits the whole set of priority arrangements to be cycled through. Another method uses a linear feedback shift register to generate a pseudo-random bit stream for each bit of each frame. Eventually all $2^N$ priority arrangements are used but not in $2^N$ frames.

The priority algorithm (using all $2^N$ inversion patterns to cause every port to be 1st priority once, 2nd priority once, etc.) can be proved as follows:

Assume the following designations: $P_N$ - - - $P_1 = N$ bits of the port number assigned to one port. This number is unique because no other port has this port number.

$I_N$ - - - $I_1$ = Sequence of values on the polarity bus. This same sequence goes to all ports.

$B_N$ - - - $B_0$ = Sequence of values presented to the arbitration bus by one port.

$P_N$ - - - $P_1$ is transformed into $B_N$ - - - $B_0$ by the algorithm $B_j = P_j \oplus I_j$ for $1 \leq j \leq N$.

A given bus priority is represented by a known sequence $B_N$ - - - $B_0$. For example 1st priority is 000 - - - 000. 2nd priority is 000 - - - 001. Last priority is 111 - - - 111. For a given port to have a certain priority there is only one of the $2^N$ sequences $I_N$ - - - $I_0$ which will achieve it. For example for a port with $P_3P_2P_1 = 101$ to be first priority ($B_3B_2B_1 = 000$) requires that the polarity bus sequence be $I_3I_2I_1 = 101$. This is the only one of the $2^N$ polarity bus sequences that will make the port first priority. It follows there is also just one polarity bus sequence that will make the port 2nd priority, 3rd priority, etc. Therefore for any given port it will be first priority once, second priority once, etc. If the polarity bus goes through all $2^N$ possible inversion patterns, the arbitration bus sequence $B_N$ - - - $B_0$ is unique for every port. There will never be any conflict that 2 ports will have the same bus priority at the same time. This is true since $B_j = P_j + I_j$ for $1 \leq j \leq N$ and since the port number $P_N$ - - - $P_0$ is unique for every port and the polarity bus $I_N$ - - - $I_0$ is identical for all ports.

TIME SLICE (Snapshot)

An added refinement to modifying the packet switching priority arrangement is to latch in all pending bus requests at any instant and then to service all those requests before any newer requests are serviced. This is done by providing flip-flop 422 which can be set to indicate a port request pending state and which, when set, applies via path 423 a 1 to shift register 400. This 1 is termed the snapshot bit (SSB) and is loaded as the most significant bit of the port ahead of the most significant bit (MSB) of the assigned port priority number from element 427.

Flip-flop 422 in each port requesting service is set during snapshot time as subsequently discussed. The first bit (SSB) gated onto the arbitration bus during each subsequent contention interval is the SSB from flip-flop 422 of each port that had a request pending the last time a snapshot was taken. Since the SSB has the highest priority, all ports with this bit set are given priority over all other ports until each port with its flip-flop 422 set has been serviced.

A new snapshot is taken when all such ports have been serviced. At that time and at the end of SSB time for that contention, the arbitration bus is low since no port has its flip-flop 422 set, the SSB is 0, and via inverting gate 406 the arbitration bus is high. This high on path 114-1 is applied to the upper input of gate 417. If a port has a REQUEST PENDING signal 216 (a high), the lower inut of AND gate 417 is high and the output of AND gate 417 is HI. This HI and the trailing edge of the frame pulse drives the Q output of flip-flop 418 HI. This HI over path 419 sets flip-flop 422. This is in effect a new snapshot since flip-flop 422 is now set in each port having a request pending signal on path 216 when the bus 102 is HI during a SSB time.

Subsequently, the HI output of flip-flop 422 of a port is loaded as a SSB into the shift-register of the port over path 423. Only ports with flip-flop 422 set will be serviced. When all such ports have been serviced, the next snapshot occurring as a HI is applied to the bus 102 when the SSB of each shift register is 0.

The selection of a port for bus access clears its flip-flop 422 when its flip-flop 421 is set. AND gate 402 is inhibited by path 426 to prevent the polarity bus 101 from inverting the snapshot bits applied to bus 102. The START OF FRAME pulse over path 426 is inverted at the lower input of INHIBITED-AND gate 402 to produce a LO output signal to exclusive-OR gate 404. This prevents inversion by exclusive-OR gate 404 of the SSB bit that shift register 400 receives over path 423 from flip-flop 422.

Figure 7:
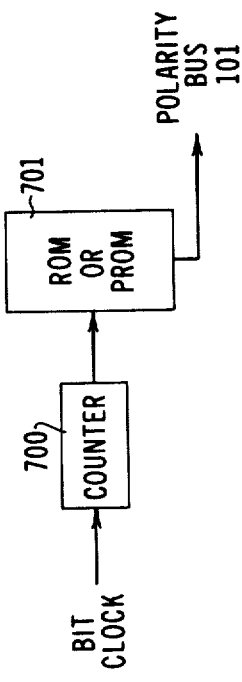
FIGS. 5, 6, and 7 discloses arrangements in the controller for applying signals to the inversion bus.
Figure 6:
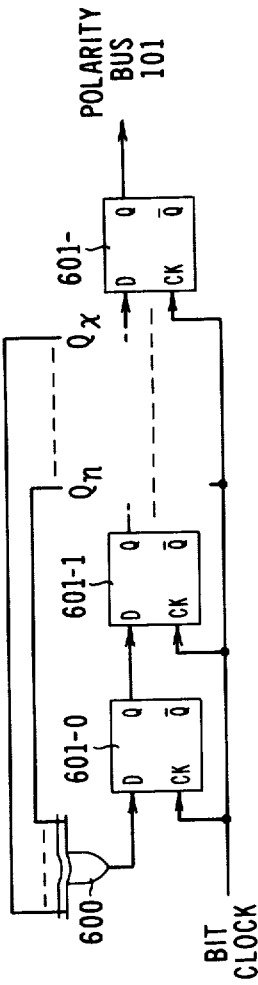
Figure 5:
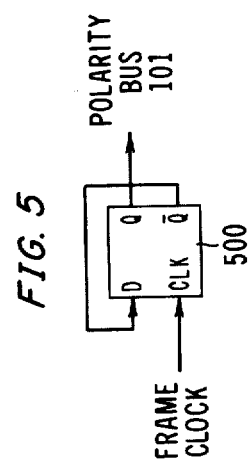

FIGS. 5, 6, and 7 show alternative arrangements for embodying the polarity generator 122 of FIG. 1. FIG. 5 discloses a flip-flop which is driven by the frame clock so that its Q output is alternately HI and LO for sequential frames. This applies HIs and LOs on alternate frames to the upper input of exclusive-OR gate 404. This causes gate 404 to pass the shift register bits unaltered when its upper input is LO for a frame and to invert the shift register bits for the frames for which its upper input is HI.

FIG. 6 discloses a plurality of flip-flops comprising a pseudo-random generator that is driven by the bit clock. This circuit randomizes the potential applied to the polarity bus on successive clock signals. This, in turn, randomizes the conditions under which the various shift register bits are inverted and thereby randomizes the port preference hierarchy for access to bus 105.

FIG. 7 discloses an arrangement comprising a counter 700 and a ROM 701. The counter is driven by the bit clock and applies address signals to the ROM which, in response to the receipt of each such address signal, reads out the contents of the addressed location to the polarity bus. By appropriate programming of the ROM, any desired arrangement for varying the port priority preference may be programmed into the ROM.

What is claimed is:

1. In a system for allocating access to a demand-shared facility among a plurality of units wherein each unit has a unique n digit priority number, and system comprising:
   a system controller,
   a polarity control conductor interconnecting said units with said controller,
   an arbitration bus interconnecting all of said units,
   means in each of said units for requesting access to said demand-shared facility,
   means in each of said units currently requesting access to said demand-shared facility for concurrently superimposing the corresponding digits of the associated priority number onto said arbitration bus sequentially digit by digit,
   means in said controller for applying an inversion signal at selected times to said polarity control conductor, wherein said superimposing means are responsive whenever said inversion signal is extant on said polarity control conductor for inverting said corresponding digits of said priority number prior to concurrently superimposing said digits on said arbitration bus sequentially digit by digit,
   means in each of said requesting units for sequentially comparing the digit value on said arbitration bus as a digit is applied thereto with the magnitude of the corresponding digit each requesting unit applies,
   means in each of said requesting units for removing itself from facility access contention upon the detection by said comparing means of said requesting unit of a prescribed comparison result between the current digit value of said arbitration bus and the value of the corresponding digit currently applied to said arbitration bus by said unit,
   and means for granting facility access to the requesting unit remaining in contention after all digits of said priority number of said remaining unit have been applied to said arbitration bus.

2. The system of claim 1 wherein said priority numbers comprise a plurality of binary digits and said superimposing means comprises:
   means for sequentially generating the logical union of corresponding priority number digits said requesting units concurrently apply to said arbitration bus.

3. The system of claim 2 wherein each of said units further comprises:
   coupling means,
   a shift register arranged to apply the priority number digits to said coupling means in a prescribed order sequentially digit by digit,
   means activated by the associated unit during a request for facility access for enabling the coupling means to apply said digits sequentially from said shift register to said arbitration bus, and
   means responsive to said comparing means detecting said prescribed comparison result for deactivating said enabling means.

4. The system of claim 3 wherein said coupling means comprises a logic gate and said enabling means comprises a bi-state device operable to a first state by its associated unit for activating said logic gate and operable to a second state by said deactivating means.

5. The system of claim 4 wherein said comparing means comprises logic gate means jointly responsive to signals from the said arbitration bus and from said storing means.

6. The system of claim 5 wherein said activating means comprises a logic device responsive to a control signal from an associated unit and to said comparing means for controlling the state of said bi-state device.

7. Circuitry distributed in each of a plurality of system ports for allocating access to a common facility among a plurality of ports requesting facility access wherein each of said ports is assigned a unique n digit priority number:
   an arbitration bus common to said ports,
   said circuitry in each of said ports comprising,
   means for storing the assigned port priority number digits,
   means activated by a facility access request signal and by a start signal from a system controller for enabling the application of each of the assigned port priority number digits sequentially digit by digit from said storing means to said arbitration bus in synchronism with the application of corresponding digits to said bus by each other of said ports currently requesting facility access,
   a polarity conductor interconnecting all of said ports with said system controller,
   means effective concurrent with the application of an inversion signal to said polarity conductor by said controller for inverting the magnitude of each digit then applied to said arbitration bus by each currently requesting port,
   means effective as each digit is applied to said bus for comparing the digit value on said bus to the value of the corresponding digit applied to said bus by each of said ports currently requesting facility access,
   means controlled by said comparing means of a port for deactivating said enabling means of said port upon the detection of a prescribed result during any digit comparison, and
   means controlled by said enabling means of a port remaining in facility contention for seizing said facility after all assigned port priority number digits of said last named port have been compared to their respective bus digit values.

8. In combination, a data bus arbitration arrangement comprising:
   a plurality of system ports,
   an arbitration bus common to all of said ports,
   clock means for supplying synchronizing clock signals to each of said ports,
   a plurality of allocating means each of which is individually associated with separate ones of said ports for allocating access to said data bus in accordance with a unique binary priority number assigned to each one of said ports, each of said allocating means within a port comprising,
   means for generating a bus access request signal,
   a shift register for storing the priority number digits assigned to a said port,
   first gate means for receiving said port priority number digits outpulsed under control of said clock signals from said shift register sequentially digit by digit in order of most significant digit to least significant digit, bi-state means controlled by said clock signals and responsive to a data bus access request signal for enabling said first gate means so that said assigned digits are outpulsed from said shift register sequentially and applied to said arbitration bus in synchronism with the application of corresponding digits to said arbitration bus by other of said ports currently requesting access to said data bus, a polarity control conductor interconnecting all of said ports, means for applying an inversion signal at selected times to said polarity control conductor, means in each port currently requesting access and effective when said first gate means is enabled and responsive when an inversion potential is extant on said polarity conductor for inverting each digit readout of said shift register prior to applying each readout digit to said arbitration bus, comparison gate means connected to said arbitration bus and to said shift register for comparing each digit value on said arbitration bus to the digit value concurrently applied to said arbitration bus from said shift register, and second gate means controlled by said comparison gate means for deactivating said enabling means whenever any digit value on said arbitration bus has a higher priority than the corresponding digit applied to said arbitration bus from said shift register.

9. In a system for allocating access to a demand-shared data bus among a plurality of ports wherein each port has an assigned unique n digit binary port priority number for controlling access to said data bus whenever a plurality of said ports are concurrently contending for access, said system comprising:

a system controller, clock means in said controller for applying synchronizing clock signals to said ports, means in each port for requesting access to said data bus, shift register means in each port for storing the assigned priority number of said port, an arbitration bus interconnecting all of said ports, a polarity control conductor interconnecting said ports with said controller, means in said controller for applying an inversion signal at selected times to said polarity control conductor, means in each of said ports currently requesting access to said data bus and controlled by said synchronizing pulses for reading out the port priority number from the shift register of each requesting port, means responsive to the read out of the shift register of each requesting port for concurrently superimposing the corresponding digits of the assigned priority number of each of said requesting ports onto said arbitration bus sequentially digit by digit as each synchronizing pulse is received when an inversion signal is not extant on said polarity control conductor, means in each requesting port responsive to the application of said inversion signal to said conductor for concurrently superimposing on said arbitration bus the inverse of the corresponding digits of the assigned priority number of each requesting port sequentially digit by digit as each synchronizing pulse is received as long as said inversion signal remains applied, means in each port for sequentially comparing the digit value on said arbitration bus as a digit is applied thereto to magnitude of the corresponding digit applied by each of said requesting ports, means in each port for removing from data bus access contention a requesting one of said ports upon the detection by the comparing means of said port of a prescribed comparison result between an arbitration bus digit value and the value of the corresponding digit then applied by said port, and means for granting data bus access to the requesting port remaining in contention after all digits of said assigned priority number of the last remaining port have been applied to said arbitration bus.

10. The system of claim 9 in combintion with:

means in each port and controlled by said controller for defining a snapshot time occurrence, means in each port for recording a data bus access request extant during a snapshot time occurrence, said last named means including means for setting a logic device from a first to a second state in each port having a service request extant during a snapshot time occurrence, means in each port having a logic device in a second state for applying a snapshot digit to said arbitration bus as a most significant digit ahead of the assigned port priority digits of said port during each bus access attempt, said last named means being effective to award data bus access to all ports having a logic means in a second state ahead of all ports having a logic device not in a second state, and inhibiting means for preventing the inversion of said snapshot bit to said arbitration bus when an inversion signal is concurrently applied to said polarity conductor.

11. A method of allocating access to a demand-shared facility among a plurality of units wherein each unit has a unique assigned n digit facility access priority number for determining facility access when a plurality of units are concurrently requesting access, said method comprising the steps of:

(1) applying an inversion signal at selected times from a controller over a polarity control conductor to all of said units, (2) concurrently superimposing on an arbitration bus, sequentially digit by digit, the corresponding digits of the priority number of each of said units currently requesting facility access when an inversion signal is not currently applied to said conductor, (3) concurrently superimposing on said arbitration bus, sequentially digit by digit, the inverse of each digit of the priority number of each of said units requesting facility access whenever said inversion signal is concurrently applied to said polarity bus, (4) sequentially comparing the digit values on said arbitration bus to the corresponding digit values applied by each of said requesting units, and (5) removing from facility access contention any requesting one of said units upon the detection of a prescribed comparison result between the arbitration bus digit value and the value of the corresponding digit then applied by said one unit, (6) and granting access to said facility to the unit remaining in contention after all of its assigned priority number digits have been applied to said arbitration bus.

12. The method of claim 11 in combination with the additional steps of:
(1) defining a snapshot time,
(2) switching from a first to second state a logic device in each unit requesting access during the occurrence of said snapshot time,
(3) applying a snapshot bit to said bus as a most significant digit ahead of the assigned priority number digits in each facility requesting access during said snapshot time, and
(4) switching from a second to a first state the logic device in each unit granted access to said facility while applying said snapshot bit to said bus.

13. A method of allocating access to a demand-shared data bus among a plurality of ports wherein each port has a unique assigned n digit binary priority number for determining data bus access when a plurality of ports are concurrently requesting access, said method comprising the steps of:
(1) storing the assigned port priority number in a shift register individual to each port,
(2) applying synchronizing pulses from a controller to said ports,
(3) applying an inversion signal at selected times from said controller over a polarity control conductor to all of said ports,
(4) detecting a request for data bus access by a port,
(5) outpulsing the priority number digits from the shift register of a requesting port under control of said synchronizing pulses,
(6) concurrently superimposing on an arbitration bus, sequentially digit by digit, the corresponding digits of the priority number outpulsed from the shift register of each of said ports currently requesting data bus access when an inversion signal is not currently applied to said conductor,
(7) concurrently superimposing on said arbitration bus, sequentially digit by digit, the inverse of each digit of the priority number outpulsed from the shift register of each of said ports requesting data bus access whenever said inversion signal is concurrently applied to said polarity conductor,
(8) sequentially comparing the digit values on said arbitration bus to the corresponding digit values applied by each of said requesting ports,
(9) removing from data bus access contention any requesting one of said ports upon the detection of a higher digit value on said arbitration bus than the value of the corresponding digit then applied by said one port, and
(10) granting data bus access to the one port remaining in contention after all of its assigned priority number digits have been outpulsed from its shift register and applied to said arbitration bus.

14. The method of claim 13 in combination with the additional steps of:
(1) defining a snapshot time,
(2) switching from a first to second state a logic device in each port requesting access during the occurrence of said snapshot time,
(3) applying a snapshot bit to said arbitration bus as a most significant bit ahead of the assigned priority digit in each port requesting access having its logic device in a second state, and
(4) switching back to a first state the logic device in each port granted access to said data bus while applying said snapshot bit to said arbitration bus.

* * * * *